Jan. 29, 1963     H. V. ANDERSON     3,075,864
OVERWRAP MATERIAL AND METHOD OF MAKING SAME
Filed Oct. 3, 1957

INVENTOR.
HARLAN V. ANDERSON
BY Moore, White & Burd
ATTORNEYS

UNITED STATES PATENT OFFICE 3,075,864
Patented Jan. 29, 1963

3,075,864
OVERWRAP MATERIAL AND METHOD
OF MAKING SAME
Harlan V. Anderson, Edina, Minn., assignor to Rap Industries, Inc., a corporation of Minnesota
Filed Oct. 3, 1957, Ser. No. 687,907
12 Claims. (Cl. 154—46.8)

This invention relates to a new and improved heat sealable overwrap material and to the novel method of making the same. More particularly, this invention relates to an overwrap material comprising an impervious base sheet material having a waxy heat sealable coating applied on one side and having a thin anti-blocking layer of polyethylene superposed upon the heat sealable coating, and to the novel transfer method by which such material is formed.

Compositions based upon microcrystalline waxes are in widespread use for applying heat sensitive coatings to sheet material to be used as an overwrap material. Such compositions perform admirably in the production of heat sealed packages. One drawback to the use of such compositions, due to their sensitivity to heat, and, to some extent, to pressure, is that those compositions which have superior tackiness and are best suited for sealing wrapped packages tend to "block." "Blocking" is the tendency of the sheet material to stick to adjacent layers when in rolled form and to adjacent sheets when stacked. It is the principal object of this invention to provide a non-blocking heat sensitive overwrap material having a thin film of polyethylene overlying the heat sensitive adhesive layer.

The provision of a thin anti-blocking film of polyethylene superposed upon a heat sensitive waxy coated base sheet is not easily accomplished. Attempted extrusion of polyethylene onto a waxy coated surface has served only to melt and destroy the heat sensitive waxy coating. It has been found, however, that if the polyethylene is first extruded onto one side of an impervious base sheet and the other side of the base sheet is coated with the heat sensitive waxy adhesive material, the polyethylene film can be made to transfer to the opposite side of the web overlying the heat sensitive layer. It is a further object of this invention, therefore, to provide a transfer method for applying a polyethylene film over a heat sensitive coating.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Figure 1:
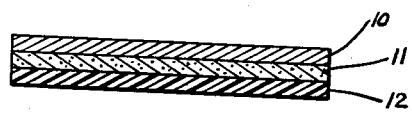
FIGURE 1 is a representation, in section, illustrating the structure of the basic overwrap material which is the subject of this invention.

Referring to the drawings, the basic structure of the overwrap material of this invention is illustrated in FIGURE 1, in which 10 indicates an impervious backing sheet, that is, one which has a smooth, dense surface to which polyethylene does not readily adhere. The base sheet 10 may be, for example, a hard finished paper sheet, metal foil, a foil-paper laminate, or the like. The base sheet 10 is coated on one side with a layer of a hot melt heat sensitive adhesive material, indicated at 11. Overlying the hot melt coating is a thin anti-blocking film of polyethylene, indicated at 12.

Figure 2:
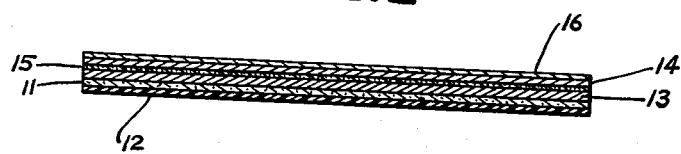
FIGURE 2 is a similar representation, in section, of the structure of a modified form of overwrap material.

In FIGURE 2 there is illustrated a modified overwrap structure in which the impervious base is a laminate including a paper base sheet 13 to which is adhered a thin metal foil 14 by means of an intermediate layer of a rubbery adhesive 15. The metal foil face of the laminate is provided with a lacquer film 16.

A variety of hot melt coatings based upon microcrystalline wax may be used in the preparation of the heat sealable overwrap. Such compositions may be composed of straight microcrystalline wax, mixtures of microcrystalline waxes of differing melting points, microcrystalline wax extended by the addition of minor proportions of paraffin wax, microcrystalline wax to which rubber or other tackifying agents have been added, and the like. The following are typical examples of heat melt adhesive compositions which may be used, all parts being by weight:

*Example I*

| | Parts |
|---|---|
| 145° F. melting point microcrystalline wax | 85 |
| 155° F. melting point paraffin wax | 15 |

*Example II*

| | |
|---|---|
| 175° F. melting point microcrystalline wax | 61 |
| 145° F. melting point microcrystalline wax | 39 |

*Example III*

| | |
|---|---|
| 145° F. melting point microcrystalline wax | 50 |
| 132° F. melting point paraffin wax | 50 |

*Example IV*

| | |
|---|---|
| 145° F. melting point microcrystalline wax | 50 |
| 175° F. melting point microcrystalline wax | 50 |

*Example V*

| | |
|---|---|
| 145° F. melting point microcrystalline wax | 68.5 |
| 155° F. melting point paraffin wax | 31.5 |

*Example VI*

| | |
|---|---|
| 150–55° F. melting point microcrystalline wax | 95 |
| Butyl rubber | 5 |

*Example VII*

| | |
|---|---|
| 150–55° F. melting point microcrystalline wax | 75 |
| Butyl rubber | 10 |
| Ester gum | 15 |

In general, the heat sealable adhesive is applied in amounts ranging from about 10 to 25 pounds per standard ream.

A typical polyethylene material which may be used in the practice of this invention for applying the extrusion coating has a melt index of 4.0, density 0.923, and is commercially available from E. I. du Pont de Nemours & Co., Inc., as "Alathon 16." Obviously, similar low density ethylene polymers available from other sources will function in the same manner and may be used. The polyethylene is preferably applied in amounts from about 1 to 5 pounds per standard ream to produce a layer having a thickness ranging from about 0.00005 to 0.0005 inch. The polyethylene may be extended by the addition of up to 25 percent by weight of microcrystalline wax without adversely affecting its anti-blocking characteristics.

The impervious base 10 may be formed of paper having a smooth, dense, hard finished calendered surface, or it may be, for example, sulfite paper, at least one surface of which has been rendered impervious by the application of a suitable scuff-proof and corrosion-resistant coating based on nitrocellulose resins, vinyls, epoxies, butyrates, or the like. Alternatively, the impervious base may be a metal foil, or, preferably, foil laminated to a paper backing as illustrated in FIGURE 2. Aluminum foil is a preferred material although, obviously, other thin metallic foil such as tin, lead, brass, etc., may be used if circumstances warrant without departing from the scope of this invention. The foil may range in thickness from 0.00025 to 0.002 inch.

Where a foil laminate is employed as the impervious base material, the foil is preferably laminated to the paper backing by means of a flexible rubber based adhesive. This overcomes the normal objectionable tendency of foil laminates to crack and separate from the paper backing along sharp fold lines and the like. Suitable flexible adhesive include the commercial products composed of a mixture of casein and neoprene latex manufactured and sold by the Borden Company as "Casco 565" and by the H. B. Fuller Company under the designation "Adhesive 738." Another suitable material is a butyl rubber cement comprising butyl rubber in a hydrocarbon solvent. A typical adhesive formulation consists of a homogeneous mixture of one part GR–I butyl rubber and one part ethylene glycol ester of hydrogenated rosin dissolved in 4.5 parts of heptane.

This material is desirably applied in amounts ranging from about ½ to 2 pounds per standard ream and preferably about 1 pound per standard ream. It is applied in a thin layer to one side of the foil which is pressed into contact with the web of paper backing. The foil may be imprinted after its lamination with any suitable design, identifying indicia, or the like, prior to application of the optional transparent lacquer coating 16. Paper comprising the impervious base, whether alone or as part of a laminate, may range in weight from 10 pounds to 60 pounds.

Figure 3:
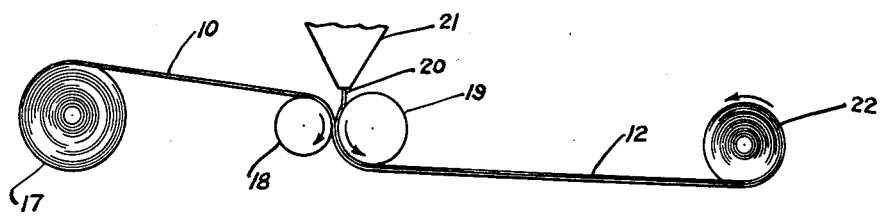
FIGURE 3 is a schematic representation of apparatus for carrying out the first coating step of the method.

The anti-blocking film of polyethylene is applied over the hot melt coating by a transfer process. Referring to FIGURE 3 of the drawings, a web of the impervious base material 10 is fed from a supply roll 17 to the nip formed between a pair of rolls 18 and 19. The roll 19 is a chilled roll, preferably formed of metal and cooled by passing cold water through it. A thin stream of hot molten polyethylene 20 is extruded from the extrusion nozzle 21 of a standard film extruding apparatus onto the surface of the chilled roll 19 in the nip between rolls 18 and 19 before coming into contact with the impervious base web. The polyethylene film is then pressed onto the web as it passes between rolls 18 and 19. The effect of the application of the polyethylene film to the chilled roll prior to its transfer to the web 10 is to partially solidify and set up the molten polyethylene film so that minimum adhesion occurs between the polyethylene film and the surface of the base web. The stream 20 of polyethylene from the extrusion nozzle 21 becomes anti-blocking film 12 upon application to the base web. The polyethylene coated web is then re-rolled into supply roll 22.

Figure 4:
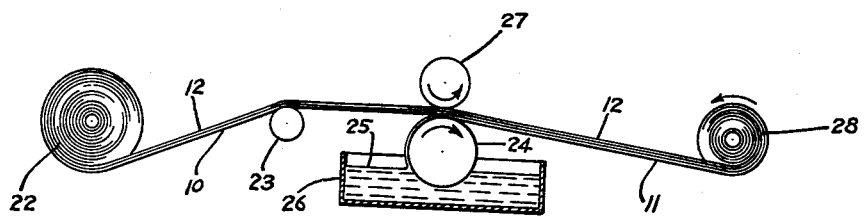
FIGURE 4 is a similar schematic representation of apparatus for carrying out the second coating step of the method.

In the next step of the transfer process, as shown in FIGURE 4, the coated web is unrolled from the supply roll 22 and passed over a guide roll 23 to a roll coating device including a coating roll 24 which is partially submerged in a bath 25 of the waxy hot melt adhesive composition contained in a suitable vessel 26. A hold down roll 27 urges the coated web into contact with the coating roll 24. The polyethylene coated web is passed through the roll coating device with the polyethylene coated surface of the web out of contact with the coating roll 24, so that, as the composite web leaves the roll coating device, the polyethylene film is on one side of the base web and the hot melt coating is on the opposite side. The thusly coated web is then immediately rewound onto supply roll 28 while the hot melt coating is still warm. Thereafter, the finished supply roll 28 is cooled the surface of the cooled supply roll is slit and the web is unwound and then rewound on another supply roll.

It will be found that in the course of rewinding the composite web while the hot melt coating is still warm and the subsequent cooling, that the adhesion between the polyethylene film and the hot melt coating is greater than the adhesion between the polyethylene film and the impervious base. Accordingly, when the supply roll 28 is slit and unwound, the polyethylene film will separate from the impermeable base to produce a web of material, as illustrated in FIGURES 1 and 2, in which the polyethylene film overlies the hot melt coating. The tacky temperature sensitive adhesive layer is thus sandwiched between the impermeable base and the polyethylene film. The result is that when this newly formed web is rewound, the hot melt coating is completely isolated and no blocking can occur. Thus, the transferred film of polyethylene completely eliminates blocking. The polyethylene film does not, however, interfere with the formation of an adequate, tight heat seal in subsequent wrapping operations. At the platen temperatures conventionally employed to effect heat sealing of wrappers having waxy heat sealable coatings, the polyethylene film also fuses and blends with the softened hot melt coating to enter into and form part of the heat seal produced. The presence of polyethylene as part of the heat seal contributes to the strength of the seal and produces a stronger bond than that resulting from the hot melt composition alone.

The polyethylene coated web need not be rewound prior to application of the hot melt coating if available working space permits passage of the coated web directly to the hot melt coating apparatus. The surface of the chilled roller 19 may be provided with a scored or patterned surface, or simply roughened, in order to emboss, perforate, or roughen the surface of the applied polyethylene film in order to provide more surface to contact and subsequently fuse with the hot melt coating. When such a roughened polyethylene film is originally formed, that irregular surface contacts the hot melt coating but the exposed anti-blocking polyethylene surface has the smooth configuration of the impervious base. When the initial polyethylene film is provided with a non-uniform surface, that film may be somewhat thicker, within the designated range, than when a smooth film is applied. In the latter instance, the maximum thickness is from about 0.00025 to 0.0003.

If the composite web from the hot melt coating apparatus is rerolled with the hot melt coating on the outside, then it is necessary to slit the outside surface down to the first polyethylene layer, or to some subsequent polyethylene layer, and then strip the wax coated impervious base layer from the polyethylene once around the circumference of the roll, and trim off the waste at the free end. Thereafter, as the roll is unwound, the material will have the structure in which the hot melt coating is sandwiched between the polyethylene and the base. When the composite web from the hot melt coating apparatus is rewound with the polyethylene film on the outside, then it is necessary only to slit the surface of the roll down to the first impervious base layer and strip the polyethylene from it, and unwind once around the circumference of the roll. Thereafter, when the waste is trimmed off, the web as unrolled will have the desired illustrated structure.

The invention is further illustrated by the following examples:

*Example VIII*

A paper-foil laminate used as the impervious base was formed by bonding a web of 0.00035 inch aluminum foil to a web of 22 pound S.C. sulfite paper by means of 1.0–1.5 pounds of adhesive composed of a mixture of casein and neoprene latex ("Casco 565"). Weights recited in this example are for a standard ream of 500 sheets, 24 x 36 inches. The exposed aluminum surface was provided with a scuff-proof and corrosion-resistant coating of nitrocellulose lacquer in the amount of about 0.75–1.0 pound. A film of low density polyethylene Alathon 16) was extruded from conventional film extruding apparatus onto the surface of a smooth, chilled steel roll and transferred almost immediately to the lacquer coated aluminum foil side of the composite impervious base web by pressing between the chilled roll and a companion roll. The polyethylene was applied in the amount of 3 pounds per ream to produce a uniform film having a thickness of about 0.0002 inch.

The thusly coated web was rewound on a supply roll which was later unwound and fed to a roll coating apparatus. A hot melt coating composition composed of 5% butyl rubber and 95% 150–155° F. melting point microcrystalline wax was applied from a molten bath by conventional roll coating means to the exposed paper surface of the composite web, that is, on the side opposite from the applied polyethylene film. The hot melt coating was applied in the amount of about 15 pounds, per ream. Thereafter, the coated composite web was rerolled after the hot melt coating was partially cooled and set up by passage through air but while the coating was still warm.

Thereafter, the rewound roll was cooled by standing for a period of hours. It had been wound with the hot melt coating on the outside. The outer surface of the cooled roll was then slit to cut through the wax layer and the foil laminate layer down to the first layer of polyethylene. When this was done, it was found that the lacquered face of the foil laminate easily stripped away from the polyethylene film. The outer peripheral layer of hot melt coated foil laminate readily stripped away from the polyethylene film. This first layer around the roll was trimmed off and discarded as waste. Thereafter as the roll was unwound, the polyethylene film was found to adhere tenaciously to the hot melt coating layer but to separate readily from the lacquer coated face of the foil.

The overwrap material comprising a layer of microcrystalline wax hot melt adhesive material sandwiched between the polyethylene film and the foil laminate was rewound on a roll for use in an automatic wrapping machine. The polyethylene film was found to be completely effective in preventing blocking. At the same time, when the web of overwrap material was used in a packaging machine, the polyethylene film did not interfere with the formation of a tight, heat seal at the seam and end flaps, but, to the contrary, the polyethylene fused with and became intermingled with the hot melt layer to add strength and durability to the heat seal.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An improved non-blocking heat sealable overwrap material comprising a thin flexible impervious base sheet, a distinct layer of a heat and pressure sensitive wax adhesive material comprised of at least 50% microcrystalline wax coated on one side of said base sheet and a thin distinct preformed anti-blocking film of polyethylene overlying said adhesive in intimate contact therewith, said polyethylene film being adhered to said adhesive layer and the interface between the polyethylene film and the adhesive layer being free from fusion between the film and layer.

2. An overwrap material according to claim 1 further characterized in that said heat and pressure sensitive wax adhesive material comprises a predominant proportion of microcrystalline wax.

3. An overwrap material according to claim 2 further characterized in that said adhesive composition contains a minor amount of butyl rubber as a tackifying agent.

4. An overwrap material according to claim 1 further characterized in that said thin flexible impervious base sheet comprises a thin metal foil.

5. An overwrap material according to claim 4 further characterized in that said foil is adhered to a thin paper backing sheet by an intermediate layer of a flexible rubbery adhesive and said heat and pressure sensitive material is applied to the paper side of the base sheet.

6. An overwrap material according to claim 5 further characterized in that the metal foil ranges in thickness from about 0.00025 to 0.002 inch.

7. An overwrap material according to claim 5 further characterized in that said paper backing sheet is of a weight from about 10 to 60 pounds.

8. An improved non-blocking moisture proof and heat sealable overwrap material comprising an impervious base sheet composed of a thin sheet of aluminum foil adhered to a thin paper backing sheet by an intermediate layer of a flexible rubbery adhesive, a distinct coating of a heat and pressure sensitive adhesive composition comprising a predominant proportion of microcrystalline wax applied to the paper side of the backing sheet and a thin distinct preformed anti-blocking film of polyethylene overlying said adhesive in intimate contact therewith, said polyethylene film being adhered to said adhesive layer and the interface between the polyethylene film and adhesive layer being free from fusion between the film and layer.

9. A method of making a non-blocking heat sensitive overwrap sheet material which comprises applying a thin film of polyethylene to one side of a web of thin flexible impervious base sheet material, applying a hot melt coating of a heat and pressure sensitive wax adhesive material comprised of at least 50% microcrystalline wax to the opposite side of said web, rewinding the web in a roll while said hot melt coating is still warm, permitting the roll to cool, superficially slitting the peripheral surface of the cooled roll transversely to permit the polyethylene film to be separated from the impervious sheet material, and unwinding, whereby the polyethylene film is transferred from the surface of the base sheet to the opposite side of the web overlying the adhesive coating as the composite overwrap is peeled from the roll.

10. The method according to claim 9 further characterized in that said film of polyethylene is applied to the web by extruding said polyethylene onto the surface of a chilled roll and then immediately contacting said web with the polyethylene film under pressure to transfer the film from the chilled roll to the web.

11. The method according to claim 9 further characterized in that said hot melt coating is comprised of a predominant proportion of microcrystalline wax applied by a roller to said web.

12. The method according to claim 9 further characterized in that said web of impervious base sheet is composed of a thin sheet of metal foil adhered to a thin paper backing sheet by an intermediate layer of a flexible rubbery adhesive, said polyethylene film is initially applied to the metal foil surface of the web and the hot melt coating is applied to the paper surface of the web.

References Cited in the file of this patent

UNITED STATES PATENTS

| | | |
|---|---|---|
| 1,966,476 | Wooddell | July 17, 1934 |
| 1,983,520 | Charch et al. | Dec. 11, 1934 |
| 2,099,641 | Bach et al. | Nov. 16, 1937 |
| 2,191,704 | Bennett | Feb. 27, 1940 |
| 2,504,270 | MacLaren et al. | Apr. 18, 1950 |
| 2,529,884 | Reynolds | Nov. 4, 1950 |
| 2,541,498 | Calvert | Feb. 13, 1951 |
| 2,568,463 | Reynolds | Sept. 18, 1951 |

(Other references on following page)

UNITED STATES PATENTS

| 2,572,959 | Sparks et al. | Oct. 30, 1951 |
| 2,607,711 | Hendricks | Aug. 19, 1952 |
| 2,607,712 | Sturken | Aug. 19, 1952 |
| 2,813,052 | Lancaster | Nov. 12, 1957 |
| 2,858,248 | Hastings et al. | Oct. 28, 1958 |

FOREIGN PATENTS

| 175,556 | Great Britain | Feb. 23, 1922 |
| 403,902 | Great Britain | Jan. 4, 1934 |
| 641,568 | Great Britain | Aug. 16, 1950 |

OTHER REFERENCES

Chemistry & Industry, "Polyethylene Film," Feb. 17, 1958, pages 82–85.